United States Patent [19]

Scholten

[11] 4,254,371
[45] Mar. 3, 1981

[54] PHOTOCOMPOSER ESCAPEMENT CARRIAGE CONTROL

[75] Inventor: Frank L. Scholten, Katonah, N.Y.

[73] Assignee: AM International, Inc., Los Angeles, Calif.

[21] Appl. No.: 937,636

[22] Filed: Aug. 28, 1978

Related U.S. Application Data

[63] Continuation of Ser. No. 802,859, Jun. 2, 1977, abandoned.

[51] Int. Cl.³ .........................G05B 19/40; B41B 13/00
[52] U.S. Cl. ..........................................318/685; 354/5
[58] Field of Search ................... 354/5, 7; 318/85, 696

[56] References Cited

U.S. PATENT DOCUMENTS

| | | | |
|---|---|---|---|
| 3,813,593 | 5/1974 | Ryberg | 318/685 X |
| 4,008,480 | 2/1977 | Szabo | 354/5 |

Primary Examiner—Joseph W. Hartary
Assistant Examiner—Thomas H. Tarcza
Attorney, Agent, or Firm—Robert S. Hulse; A. W. Karambelas; R. C. Curfiss

[57] ABSTRACT

A series of velocity curves are generated empirically to create a library of information from which a pulse rate for a stepper motor may thereafter be called upon to drive a load a given distance in the minimum time without rebound, known as ringing.

1 Claim, 5 Drawing Figures

PHOTOCOMPOSER ESCAPEMENT CARRIAGE CONTROL

This is a continuation, of application Ser. No. 802,859 filed June 2, 1977, now abandoned.

BACKGROUND OF THE INVENTION

Photocomposition is accomplished by projecting a series of images along a line of composition. The images are projected onto a photosensitive surface.

In the composition, the characters must be spaced from one another. The spacing varies according to assigned width values. Word spacing is a larger value than character spacing.

Spacing is accomplished by many differing means in various photocomposing machines. One very successful machines is the Comp/Set brand sold by Addressograph Multigraph Corporation of Cleveland, Ohio, U.S.A. U.S. Pat. No. 4,008,480 illustrates the lens and escapement system of that machine, wherein a mirror carriage is reciprocated by a stepper motor operation through a cable system.

The illustrations and teaching of U.S. Pat. No. 4,008,480 are incorporated by reference herein as if a part hereof. The structure of this prior patent was first used with a direct entry keyboard and did not operate at high speed. Hence there was no problem with the mirror being in ringing movement when a character is projected. The system simply uses a delay to allow any ringing to cease before character projection.

However, if the system is operated as a unit separate from a direct entry keyboard, such as under tape input, at a much greater speed, the system takes on an elastic characteristic.

Even though the drive cables are stable woven wire, and the carriage is very light in weight, speeds of 80 lines per minute as required in faster operation, will magnify the inertia and elastic nature of the system.

Ringing is a term which signifies the settling characteristic of the carriage. After attaining speed, the carriage inertia will cause the cables to stretch and retract when the the drive is stopped. The continued inertial carriage movement will then cause rebound. On an oscilloscope the forward and reverse movement appears as a diminishing wave form similar to the accoustical wave form of a bell.

SUMMARY

The advantage of this invention is that a resilient drive system may be tested empirically to determine a relationship between the drive steps of a stepper motor and the resultant movement of a driven carriage. Such testing is carried out for every needed distance of carriage movement. The steps of the motor are altered in speed to both accelerate and decelerate the carriage. Then the empirically determined data of profile curves is entered into memory where it is available to direct the number, spacing, and rate of motor steps for any desired carriage journey.

DESCRIPTION OF THE PREFERRED EMBODIMENT

Figure 1:
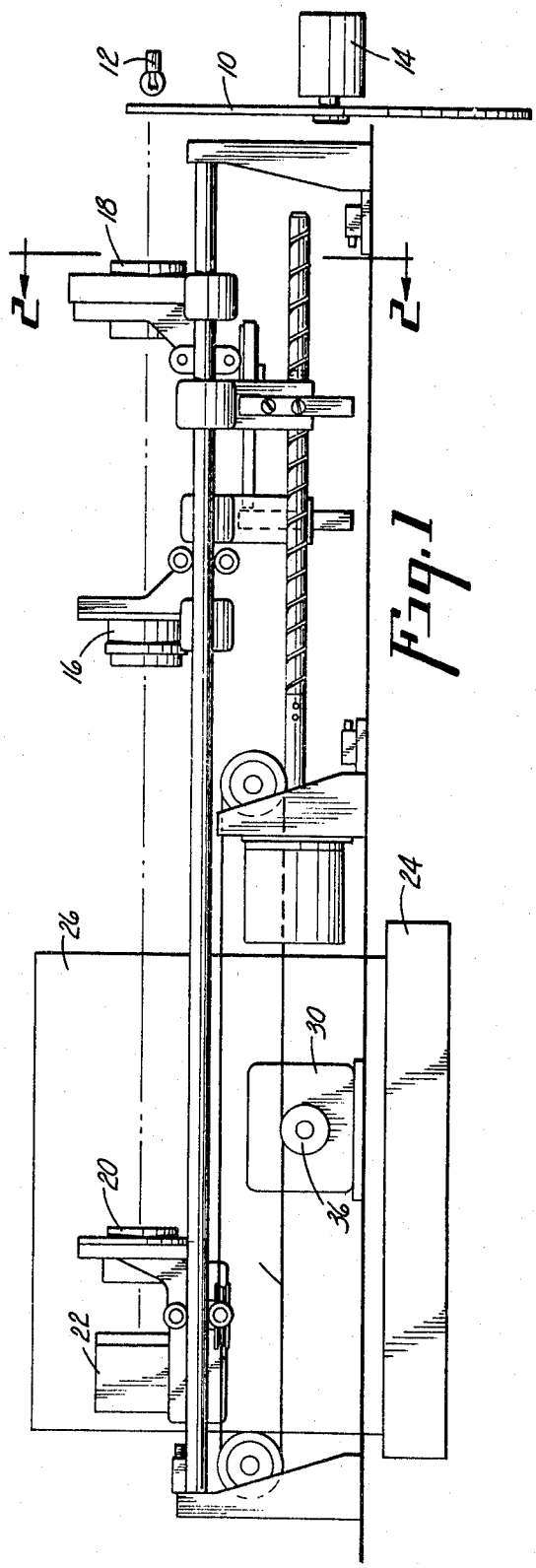
FIG. 1 is a side elevational view of the mechanical lens positioning system of a photocomposition machine with the font source and flash system shown schematically.

For justification of a composed line of type it is necessary to increase the space between words in order to spread the amount of extra space that would ordinarily appear at the end of a line into those spaces throughout the line for better appearance.

These spacing problems and their solutions were not possible on a standard typewriter, and were solved by the use of a manual strike-on typewriter using a mechanical memory. The most successful of such machines was sold under the VariTyper trademark and was the forerunner of modern phototypesetting.

In phototypesetting, the same problems occur and the same solutions are used with respect to spacing of the letters. However, the spacing of the letters and the provision of extra spaces between words is done by projecting the image of a letter rather than by hardware which strikes a paper sheet. In order to accomplish kerning as well as word spacing and letter spacing for the difference between wide letters and narrow letters, a very fine escapement capability is required. Because phototypesetting machines are operated by electrically driven prime mover devices, the logical solution is a stepper motor which can be programmed to step the precise number of units from a given starting point according to a controller program for the machine.

This device employs a stepper motor 30 to operate the mechanical motion reduction system 32. System 32 is very similar to a double acting block and tackle construction known in the mechanical arts as a pulley system.

The system employs a flexible line 34 which is secured to a drive spool 36 mounted on and driven by the output shaft of the motor 30. The line 34 is then reeved around a pulley 38 which pulley may be considered to be a stationary position turning surface. It is better that the surface be a rotatable pulley to eliminate sliding friction drag. The carriage for the decollimating or converging lens 20 has mounted on the bottom thereof a rotatable pulley 40 and line 34, after looping around the pulley 38, is directed around the pulley 40 and back to a fixed anchoring point 42 on the frame of the machine.

Figure 3:
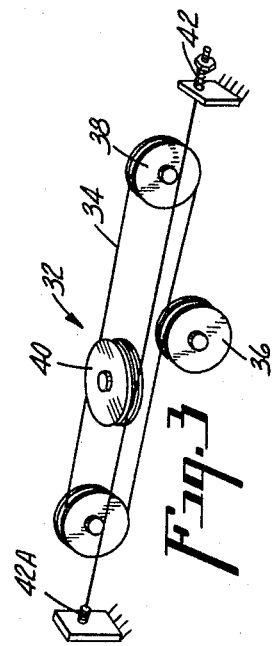
FIG. 3 is a perspective illustration of the mechanical motion drive system for the escapement carriage of the composer of FIG. 1.
Figure 2:
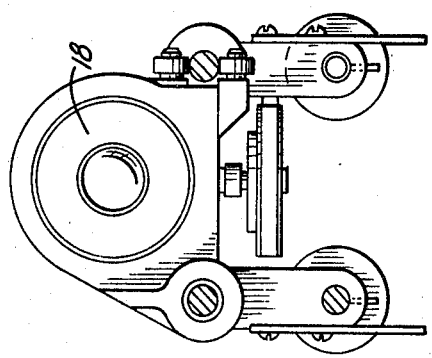
FIG. 2 is a section view taken along line 2—2 of FIG. 1.

Assume at this point that there is a force tending to move the carriage for the lens 20 in the direction of pulley 38A in FIG. 3. Then, as the motor turns the spool 36 to take up the line 34, the mechanical nature of the system will cause the pulley 40 and hence the carriage for lens 20 to move toward the fixed position pulley 38, but the line 34 will remain tight.

Then, by wrapping the counterpart line 34A around the pulley 36 in the opposite direction from the line 34, and threading the line about the fixed position pulley 38A, the second guide groove on the pulley 40 and back to ground position 42A, it will be seen that as the spool 36 takes up on line 34 it lets out on line 34A, and the system is balanced. When the motor reverses the opposite is true, and the line 34A will be taken up and the line 34 will be paid out. As a result, an exact movement of the pulley 40 is achieved, but due to the mechanical advantage nature of the pulley system construction, the movement of the pulley 40 is only half of the movement of the pulley 36. This is a known mechanical phenomenon.

Although the structure of FIG. 1 is an exact illustration of an operating, very highly successful direct entry photocomposing system, it is elastic in nature in that the motor 30 and cables 34 and 34A are capable of some degree of elasticity. The carriage which carries the lens 20 and the mirror 22 is of very lightweight construction, but nonetheless has a degree of inertia. The inertia of the system, including the carriage and its burden, causes the carriage to overshoot and then elastically return. The internal elasticity of the motor is also a contributor. Such overshooting and return at the target position is known as "ringing" because of the similarity to the decay wave form of the acoustic sound wave of a bell that has been struck. Such ringing motion will cause a misplaced character projection unless the projection is delayed until the ringing motion stops. Waiting for such settling time is detrimental to the rapid speed desired for the escapement carriage.

The innovation of this disclosure enables the reciprocating carriage displacement device to compete successfully with the much lower inertia oscillating mirror structure, such as found in U.S. Pat. No. 3,687,025, but has the advantage of an escapement path parallel to the paper form and therefore no need to accept lower quality focusing or the need for focus compensation devices such as in U.S. Pat. No. 3,687,025.

Target objective of this invention is the broad concept of pulsing the drive motor as rapidly as it can accept the load without slipping, to accelerate the carriage and escapement mirrors as rapidly as possible. Acceleration should continue to a maximum speed and then deceleration caused to take place to bring the carriage to the exact excapement position, and no further.

Figure 5:
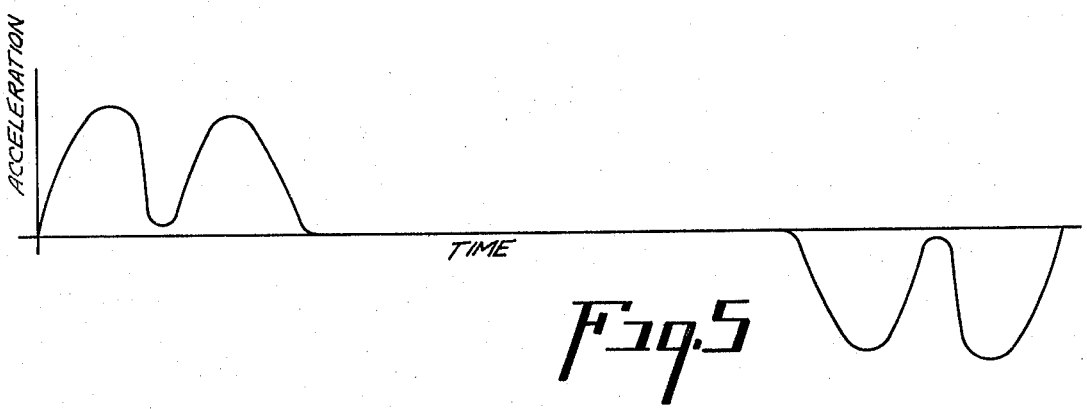
FIG. 5 is an acceleration chart of the FIG. 4 velocity curve.

It is theoretically possible to impart an acceleration to the carriage for a finite period of time, and then apply a braking motion to the carriage, including windage and friction, to bring the carriage to a precise target position without ringing. A method according to this invention has been established to accomplish that goal with precision. First was the concept of pulsing the motor to accelerate and thereafter decelerate, and plotting a velocity/time profile having a series of steps thereby determining empirically for the series the times between steps to accelerate and decelerate a given mass of the carriage and drive system such that it moves a selected number of steps and arrives at the new desired position with minimum velocity and acceleration in the minimum amount of time. To prove this concept and reduce it to practice, a great number of arbitrarily chosen step patterns were applied to the motor, and the resultant carriage travel traced on an oscilloscope. Therefore, a great number of arbitrary stepping pulses was established by means of a programmable control to develop a series of acceleration and deceleration curves whereby the carriage was brought to a maximum selected velocity in the shortest period of time possible. It was learned from this empirical study that the motor velocity led the carriage velocity for a period of time, whereafter the motor acceleration is slowed to a point where the elastic nature of the system caused the carriage not only to catch up but to surpass the velocity of the motor due to the releasing of the stored elastic energy. Then, the acceleration of the motor is increased until the velocity/time curves of the motor and carriage merge at a selected top velocity, whereafter the acceleration of both are at zero. FIG. 5 illustrates the fact that, although the velocity of the motor never slows on the start of a journey, the acceleration actually slows almost to zero, then declines to zero at the selected steady velocity level. The reverse takes place on deceleration.

Accordingly, further arbitrary empirical times were established wherein the motor steps were pulsed at greater intervals to thereby cause the motor to lag behind the speed of the accelerating carriage and act as a braking force on the carriage.

Figure 4:
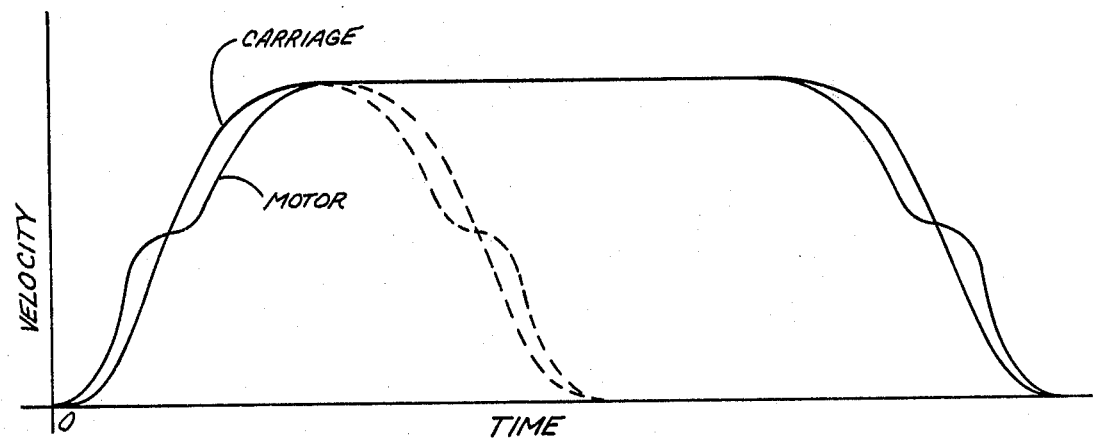
FIG. 4 is a velocity and time chart of a master profile.

The FIG. 4 is an illustration of the resultant relationship between the motor and the carriage. FIG. 4 is not a scale drawing of the exact relationship, but rather is a teaching illustration which symbolizes the mass of oscilloscope curves developed for the actual production of a memory system to accomplish the method of this invention.

After the mass of empirical data is assembled to bring the carriage to a velocity of acceptable magnitude, the times between steps to accelerate and decelerate the given mass of the carriage and drive system is placed in memory as a step profile for each possible number of steps. The memory contains the information for each possible profile starting from the second step to any chosen maximum which may therefore be designated "N" steps. Then, a control logic is provided to call out the steps in memory for any particular distance which is desired for carriage movement, and the stored steps and frequency of steps will then be applied to the motor under the control logic, to accomplish the acceleration and deceleration as empirically established.

It is theoretically possible to pulse the motor continually, always leading the carriage, until a maximum velocity is reached from which it is then possible for the motor to be decelerated sufficiently to bring the carriage to a proper stable target position. This could be accomplished by the motor leading the carriage until the latest period of time when it is necessary, as found by empirical methods, to apply a braking action to bring the carriage to the target position. Such a continuously accelerating and then decelerating curve would produce the most rapid movement from point to point. However, the amount of storage data to contain the mass of information for such a set of curves would be very massive and excessively expensive. It has been estimated that possibly 14,000 different profile patterns would be required to satisfy the necessary photocomposition requirements.

Therefore, a trade-off was selected wherein 16 steps from start to a useful, although not maximum, velocity could be achieved. The number 16 was selected because it is binary and because the amount of memory necessary to contain all of the steps from zero to the velocity obtained at 16 steps is within economic balance for the cost of the market to be served.

It is also to be understood that the concept of this invention includes profiles from the second step through the 16 steps necessary for the 16 steps to reach maximum velocity, and 16 steps to decelerate to zero velocity. It is not possible to profile one step, and therefore it is considered that this invention is concerned with steps 2 through an arbitrary maximum number, which has been selected as 32 steps in actual practice.

After the carriage and the motor have reached equilibrium at the selected velocity which is produced by the 16 input steps, then the concept of this invention is that the time between steps necessary to accelerate each component of this system at a constant velocity is also determined empirically such that the components are in equilibrium with one another at this velocity with minimum acceleration and each component of the system, whereby any number of steps can be traveled at substantially constant velocity.

It should be noted from FIG. 4 that the series of arbitrary steps for the motor which produces the velocity of the constant velocity of the curve, followed by the deceleration curve to bring the carriage to a non-ringing target position, is then simply stretched out by the number of steps at constant velocity and the same deceleration then applied at the chosen target position.

Note: At less than 16 steps there is no need to match the carriage and motor acceleration at a selected velocity. Hence, only the matching of deceleration to shape the curves to match at zero velocity is required.

What is claimed is:

1. In a system having an escapement carriage coupled by cable to a stepper motor and driven by the stepper motor, a method of controlling the stepper motor using selected motor step data representing a selected number of time intervals between steps for moving the carriage a selected distance from a first to a second stationary position at a selected maximum velocity in a manner which substantially eliminates ringing when stopping of the carriage at the second stationary position, the method comprising the steps of:

accelerating the motor to a selected velocity in accordance with selected ones of the motor step data such that the motor velocity leads the carriage velocity for a selected period of time;

decreasing the rate of acceleration of the motor in accordance with selected ones of the motor step data until the velocity of the carriage equals then surpasses the velocity of the motor;

increasing the rate of acceleration of the motor in accordance with selected ones of the motor step data until the motor achieves a selected maximum velocity equaling the velocity of the carriage;

advancing the motor in accordance with selected ones to the motor step data at a rate corresponding to the maximum velocity and substantially zero acceleration;

decelerating the motor to a selected velocity in accordance with selected ones of the motor step data such that the velocity of the motor lags the velocity of the carriage;

decreasing the rate of deceleration of the motor in accordance with selected ones of the motor step data until the velocity of the motor equals then surpasses the velocity of the carriage; and increasing the rate of deceleration of the motor in accordance with selected ones of the motor step data until the carriage reaches substantially zero velocity thereby substantially eliminating ringing when the carriage is stopped.

* * * * *